United States Patent [19]

Bittar

[11] Patent Number: 6,163,155
[45] Date of Patent: Dec. 19, 2000

[54] ELECTROMAGNETIC WAVE RESISTIVITY TOOL HAVING A TILTED ANTENNA FOR DETERMINING THE HORIZONTAL AND VERTICAL RESISTIVITIES AND RELATIVE DIP ANGLE IN ANISOTROPIC EARTH FORMATIONS

[75] Inventor: Michael S. Bittar, Houston, Tex.

[73] Assignee: Dresser Industries, Inc., Dallas, Tex.

[21] Appl. No.: 09/238,832

[22] Filed: Jan. 28, 1999

[51] Int. Cl.[7] .............................. G01V 3/28; G01V 3/30; G01V 3/38

[52] U.S. Cl. .......................... 324/338; 324/339; 324/343; 702/7

[58] Field of Search .................. 324/338–343; 702/7, 11

[56] References Cited

U.S. PATENT DOCUMENTS

| | | | |
|---|---|---|---|
| Re. 32,913 | 4/1989 | Clark | 324/338 |
| 3,014,177 | 12/1961 | Hungerford et al. | 324/339 X |
| 3,187,252 | 6/1965 | Hungerford | 324/343 |
| 3,808,520 | 4/1974 | Runge | 324/6 |
| 4,302,722 | 11/1981 | Gianzero | 324/339 |
| 4,780,857 | 10/1988 | Lyle et al. | 367/35 |
| 4,940,943 | 7/1990 | Bartel et al. | 324/338 |
| 4,962,490 | 10/1990 | Lyle et al. | 367/35 |
| 4,980,643 | 12/1990 | Gianzero et al. | 324/339 |
| 5,200,705 | 4/1993 | Clark et al. | 324/338 |
| 5,230,386 | 7/1993 | Wu et al. | 175/45 |
| 5,241,273 | 8/1993 | Luling | 324/338 |
| 5,278,507 | 1/1994 | Bartel et al. | 324/338 |
| 5,329,448 | 7/1994 | Rosthal | 364/422 |
| 5,389,881 | 2/1995 | Bittar et al. | 324/338 |
| 5,508,616 | 4/1996 | Sato et al. | 324/343 |
| 5,550,473 | 8/1996 | Klein | 324/338 |
| 5,656,930 | 8/1997 | Hagiwara | 324/339 |
| 5,886,526 | 3/1999 | Wu | 324/338 |
| 6,044,325 | 3/2000 | Chakravarthy | 702/7 |

FOREIGN PATENT DOCUMENTS

| | | | |
|---|---|---|---|
| 92402243 | 8/1992 | European Pat. Off. | G01V 3/12 |
| 97118854 | 10/1997 | European Pat. Off. | G01V 3/30 |

OTHER PUBLICATIONS

Zhu, T. and L. Brown, "Two–dimensional Velocity Inversion and Synthetic Seismogram Computation," Geophysics, vol. 52, No. 1, Jan. 1987; p. 37–49.

Bittar, M. and P. Rodney, "The Effects of Rock Anisotropy on MWD Electromagnetic Wave Resistivitiy Sensors," The Log Analyst, Jan.–Feb. 1996, p. 20–30.

Hagiwara, T., "A New Method to Determine Horizontal–Resistivity in Anisotropic Formations without Prior Knowledge of Relative Dip," 37th SPWLA Annual Logging Symposium, New Orleans, LA, Jun. 16–19, 1996, p. 1–5 and three pages of figures.

Bittar, M., P. Rodney, S. Mack, and R. Bartel, "A True Multiple Depth of Investigation Electromagnetic Wave Resistivity Sensor: Theory, Experiment and Prototype Field Test Results," SPE 22705, 66th Annual Technical Conference and Exhibition of the Society of Petroleum Engineers, Dallas, TX, Oct. 6–9, 1991, p. 1–8 and ten pages of figures.

Mack, S., P. Rodney, and M. Bittar, "MWD tool accurately measures four resistivities," reprint from Oil & Gas Journal, week of May 25, 1992, p. 1–5.

(List continued on next page.)

*Primary Examiner*—Gerard Strecker
*Attorney, Agent, or Firm*—Cox & Smith Incorporated

[57] ABSTRACT

This invention is directed to a downhole method and apparatus for simultaneously determining the horizontal resistivity, vertical resistivity, and relative dip angle for anisotropic earth formations. The present invention accomplishes this objective by using an antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. Although this invention is primarily intended for MWD or LWD applications, this invention is also applicable to wireline and possible other applications.

37 Claims, 10 Drawing Sheets

OTHER PUBLICATIONS

Bittar, M., P. Rodney, and W. Hendricks, "Invasion Profiling With a Multiple Depth of Investigation Electromagnetic Wave Resistivity Sensor," SPE 28425, $69^{th}$ Annual Technical Conference and Exhibition of the Society of Petroleum Engineers, New Orleans, LA Sep. 25–28, 1994, p. 1–12 and eleven pages of figures.

Luling, M.G., R. Rosthal, and F. Shray, "Processing and Modeling 2–MHz Resistivity Tools in Dipping, Laminated Anisotropic Formations," SPWLA $35^{th}$ Annual Logging Symposium, Jun. 19–22, 1994, p. 1–25.

ELECTROMAGNETIC WAVE RESISTIVITY TOOL HAVING A TILTED ANTENNA FOR DETERMINING THE HORIZONTAL AND VERTICAL RESISTIVITIES AND RELATIVE DIP ANGLE IN ANISOTROPIC EARTH FORMATIONS

BACKGROUND OF THE INVENTION

1. Field of the Invention

This invention relates generally to a method and apparatus for determining the horizontal and vertical resistivities and the relative dip angle of a borehole in an electrically anisotropic earth formation. More specifically, this invention relates to an electromagnetic wave induction technique for measuring resistivity using a tool having an antenna that is disposed within a plane which is inclined with respect to a plane that is normal to the axis of the tool.

2. Description of the Related Art

In the field of petroleum well drilling and logging, electromagnetic wave resistivity sensors are frequently used to provide an indication of the electrical resistivity of rock formations surrounding an earth borehole. Such information regarding resistivity is useful in ascertaining the presence or absence of hydrocarbons. A typical electromagnetic wave resistivity tool comprises a transmitter antenna and a pair of receiver antennas located at different distances from the transmitter antenna along the axis of the tool. The transmitter antenna is used to transmit electromagnetic waves into the surrounding formation. In turn, the magnetic field in the formation induces an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation. The point in the formation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

If a formation is electrically isotropic, the resistivities measured at the various depths of investigation by such an electromagnetic wave resistivity tool will be the same. However, if the resistivities corresponding to the various depths of investigation are different, such differences indicate that the formation being measured is electrically anisotropic. In electrically anisotropic formations, the anisotropy is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\alpha$, is defined as $\alpha = [R_v/R_h]^{1/2}$.

The relative dip angle, $\theta$, is the angle between the borehole axis (tool axis) and the normal to the plane of the formation. If the axis of an electromagnetic wave resistivity tool is perpendicular to the plane of an anisotropic formation (i.e., $\theta = 0°$), both the phase shift and amplitude attenuation measurements reflect only the horizontal resistivity. However, if the axis of the tool is inclined with respect to the normal of the formation plane (i.e., for non-zero relative dip angle), the rock anisotropy affects the resistivity derived from phase shift measurements ("phase shift resistivity" or $R_\Phi$) differently than it affects the resistivity derived from amplitude attenuation measurements ("amplitude attenuation resistivity" or $R_A$). For small relative dip angles (e.g., $\theta$ less than about 45°), the difference between phase shift and amplitude attenuation resistivities is relatively small. However, this difference becomes significant for relative dip angles greater than about 50°, and the difference is large for horizontal boreholes (i.e., $\theta = 90°$).

Before the present invention, practitioners in the art have used a number of techniques to determine the anisotropy of earth formations, most of which involve the use of coil antennas to measure resistivity. However, each of the existing techniques suffers from one or more disadvantages. For example, U.S. Pat. No. 4,980,643, issued Dec. 25, 1990 to Gianzero and Su, teaches the use of additional receiver coils oriented differently from (not co-axial with) conventional receiver coils to detect skew signals induced by skewness in the magnetic field pattern in the presence of asymmetrical formations. The axis of such additional receiver coils according to the '643 patent is preferably orthogonal to that of the conventional receiver coils, which are co-axial with the tool axis. However, such orthogonal coil (antenna) configurations are not generally considered practical for a measuring while drilling (MWD) or logging while drilling (LWD) tool because, if the coil is located in the interior of the tool, the presence of the coil necessitates a non-conventional mud flow path and decreases the mechanical strength of the tool. If, on the other hand, the additional coil is located on the exterior of the tool, the coil is susceptible to damage by formation cuttings in the return mud flow.

Similarly, U.S. Pat. No. 5,329,448, issued Jul. 12, 1994 to Rosthal, discloses a method and apparatus for determining the horizontal and vertical resistivities of an earth formation using an iterative error minimization technique. However, the '448 patent, which discloses a conventional antenna configuration in which the transmitter and receiver coils are aligned co-axially with the tool, does not provide a way to determine the relative dip angle. Instead, the relative dip angle must be obtained from another measurement source or from prior knowledge of the formation. Likewise, U.S. Pat. No. 5,656,930, issued Aug. 12, 1997 to Hagiwara, discloses a method for determining the anisotropic properties of subterranean formations comprising thinly laminated sand/shale sequences using an induction logging tool. However, like the '448 patent, the method of the '930 patent requires the derivation of the relative dip angle from another measurement.

In a technical paper entitled "A New Method to Determine Horizontal Resistivity in Anisotropic Formations Without Prior Knowledge of Relative Dip," 37th SPWLA 37th Annual Logging Symposium, New Orleans, Jun. 16–19, 1996, Hagiwara discloses a method to determine the horizontal resistivity for deviated boreholes or dipping formations using two conventional induction-type resistivity measurements. However, Hagiwara's method does not provide the relative dip angle. To obtain the relative dip angle, the formation anisotropy must be known. Moreover, Hagiwara showed that, for conventional induction logging tools (in which the transmitter and receiver antennas are oriented co-axially with the tool), it is impossible to obtain all three parameters (horizontal resistivity, vertical resistivity, and relative dip angle) simultaneously. The reason such a simultaneous solution is not possible using conventional induction logging tools is that, in the response of such tools, the vertical resistivity and the relative dip angle are coupled (i.e., they are not independent).

In European Patent Application No. 97118854.5 by Wu, published May 6, 1998, Wu discloses a method and apparatus for determining horizontal conductivity, vertical conductivity, and relative dip angle during a drilling operation. If the relative dip angle is unknown, Wu's technique involves the formulation of a relationship between the dielectric constants of the formation to the anisotropic conductivities of the formation. However, in the proof by Hagiwara mentioned above, the dielectric constants are assumed quantities, and their contribution to the phase shift resistivity is minimal. Therefore, even if the dielectric constants are known, the vertical resistivity and the relative dip angle are still coupled and do not allow for a simultaneous solution.

It would, therefore, be a significant advancement in the art to provide an improved method and apparatus for simultaneously determining the horizontal resistivity, vertical resistivity, and relative dip angle in a MWD or LWD mode or operation.

SUMMARY OF THE INVENTION

Accordingly, this invention is directed to an improved downhole method and apparatus for simultaneously determining the horizontal resistivity, vertical resistivity, and relative dip angle for anisotropic earth formations. The present invention accomplishes this objective by using an antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. Although this invention is primarily intended for MWD or LWD applications, this invention is also applicable to wireline and possible other applications.

BRIEF DESCRIPTION OF THE DRAWINGS

This invention may best be understood by reference to the following drawings.

DETAILED DESCRIPTION OF A PREFERRED EMBODIMENT

Figure 1:
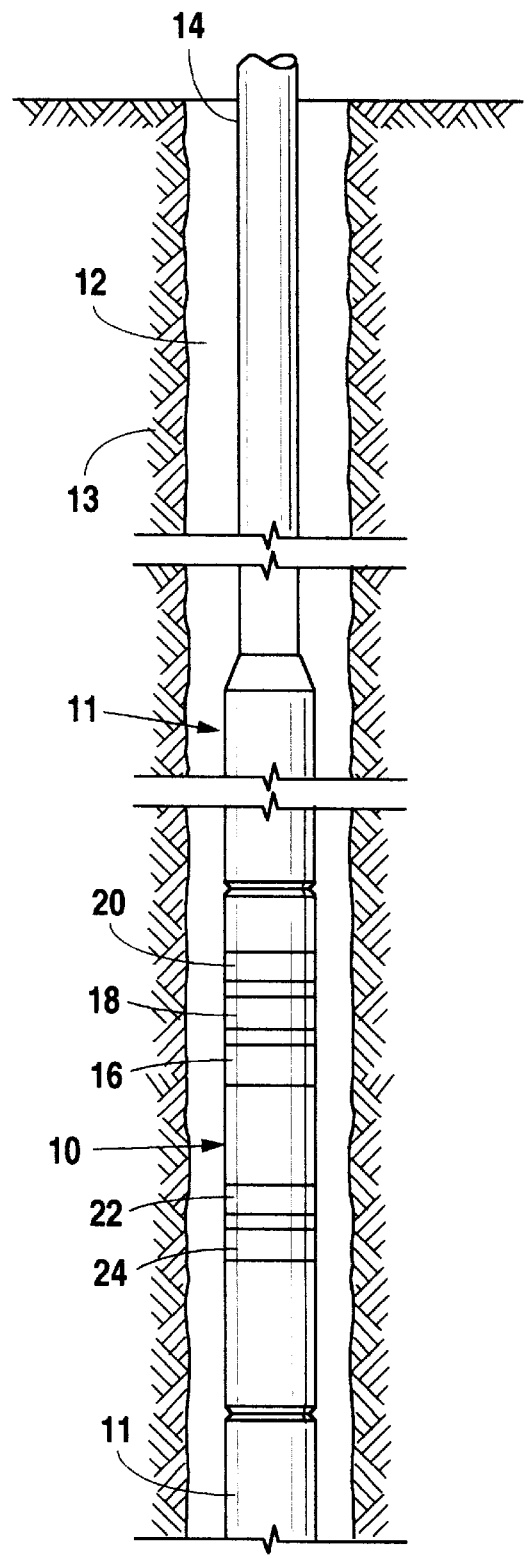
FIG. 1 is a schematic elevational view of an electromagnetic wave resistivity tool in accordance with the present invention.
Figure 2:
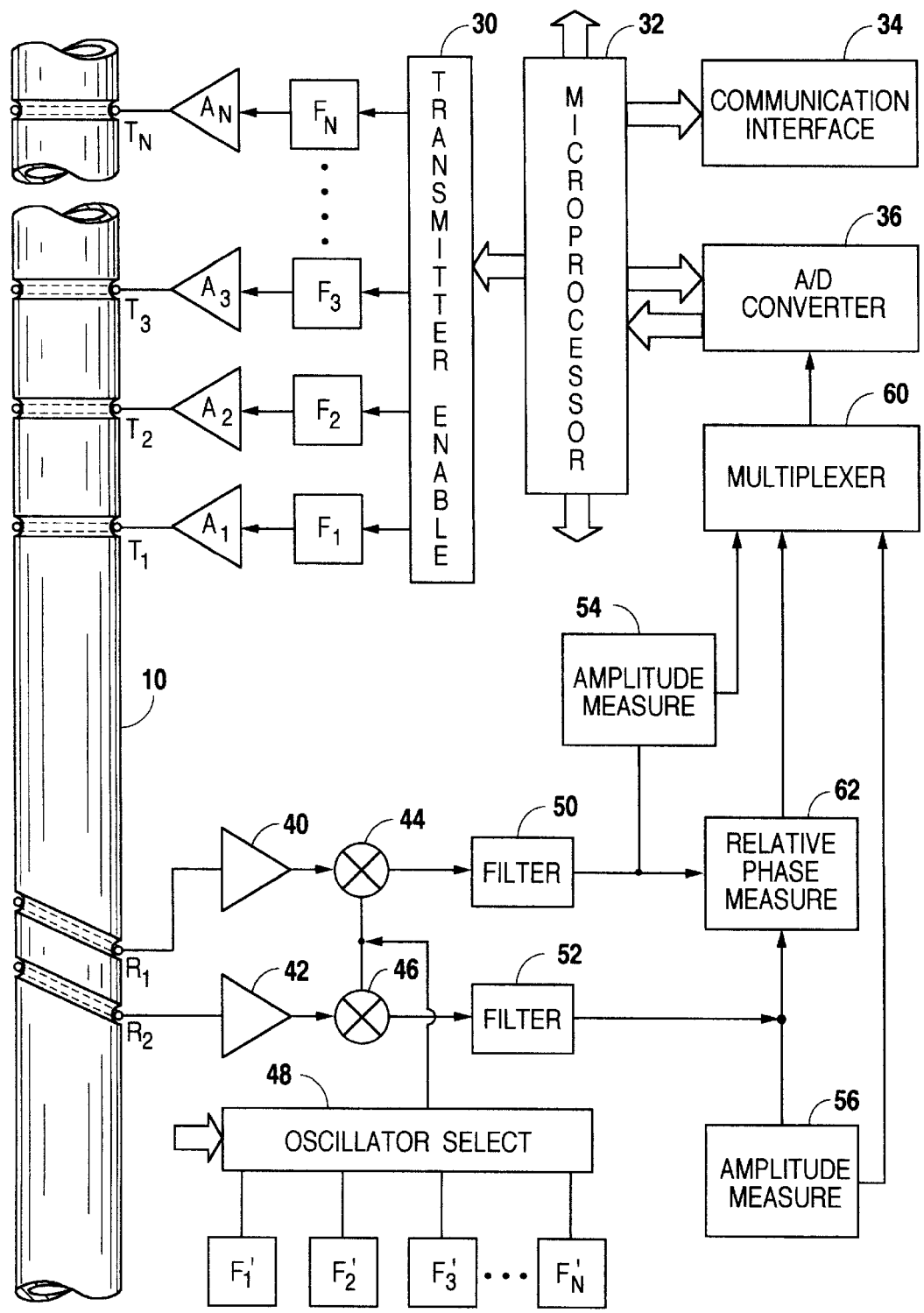
FIG. 2 is a schematic elevational view of a portion of the tool of FIG. 1 showing a block diagram of the circuitry used in accordance with the present invention.

FIG. 1 illustrates a logging tool 10 in accordance with the present invention suspended in a borehole 12 within an earth formation 13 on a string of drill pipe 14. Drill string 14 includes one or more drill collars 11. Electromagnetic transmitters (antennas) 16, 18, and 20 (sometimes referred to herein as transmitters $T_1$, $T_2$, and $T_3$, respectively) are spaced along the length of logging tool 10 from electromagnetic receivers (antennas) 22 and 24 (sometimes referred to herein as $R_1$ and $R_2$, respectively). Preferably, transmitters 16, 18, 20 and receivers 22, 24 are mounted in recesses in tool 10 (as indicated in FIG. 2) and are covered with a non-conductive material (not shown), as is well known in the art. If a transmitter is designed to operate at more than one frequency, for example, $f_1$=2 MHz and $f_2$=1 MHz, each receiver may comprise a pair of coils, with one coil tuned to $f_1$ and one coil tuned to $f_2$. Additionally, if desired, each pair of such receiver coils may be located side by side around the periphery of tool 10 or may be concentrically stacked. Transmitters 16, 18, 20 and receivers 22, 24 may be fabricated in accordance with the teachings of U.S. Pat. No. 4,940,943, which is assigned to the assignee of the present invention and is incorporated herein by reference. It should be appreciated that the body of tool 10 is preferably made of steel in order to prevent tool 10 from becoming a weak link in the drill string 14. Typically, and in a manner well known in the art, one or more drill collars 11 are threadably connected to the lower end of logging tool 10, and a drill bit (not illustrated) is threadably connected to the lowest drill collar 11.

It should be appreciated that logging tool 10 also has the requisite electronic circuitry (illustrated in FIG. 2) for processing the signals received by receivers 22, 24 in accordance with the present invention, thereby converting the received signals into a log or another indication of formation resistivity. It should also be appreciated that the processed signals can be recorded within the electronics section of tool 10 or may be fed by a conventional telemetry system (not illustrated) to the surface for concurrent processing and readout at the surface. A typical telemetry system generates mud pulses that can be detected at the earth's surface and are indicative of the processed signals.

Referring to FIG. 2, well logging tool 10 is illustrated as having a plurality of transmitters $T_1, T_2, T_3 \ldots T_n$. Although a preferred embodiment comprises only three such transmitters ($T_1, T_2,$ and $T_3$), $T_n$ is illustrated for purposes of showing that additional transmitters may be used, if desired. It should be appreciated that $T_1, T_2, T_3 \ldots T_n$ are successively further spaced from the receiver pair $R_1$ and $R_2$. The distance between the coils used for $R_1$ and $R_2$ is preferably six inches along the longitudinal axis of tool 10, but other receiver spacings may also be used. The distance between the receiver pair and the successively spaced transmitters will vary in some applications, as discussed hereinafter in greater detail. A preferred configuration contains a distance between $T_1$ and $R_1/R_2$ of 12 inches/18 inches; a distance between $T_2$ and $R_1/R_2$ of 24 inches/30 inches; and a distance between $T_3$ and $R_1/R_2$ of 36 inches/42 inches. In the foregoing sentence, it should be understood that the term "12 inches/18 inches," for example, indicates that the distance between $T_1$ and $R_1$ is 12 inches and that the distance between $T_1$ and $R_2$ is 18 inches, based upon $R_1$ and $R_2$ being six inches apart. Such spacing configurations are sometimes referred to herein using an abbreviated expression of, for example, "12/18."

Still referring to FIG. 2, a plurality of amplifiers $A_1, A_2, A_3 \ldots A_n$ are coupled to the transmitter coils $T_1, T_2, T_3 \ldots T_n$, respectively. The plurality of amplifiers, in turn, are driven, respectively, by oscillators $F_1, F_2, F_3 \ldots F_n$. The operating frequencies of the oscillators are preferably between about 0.5 MHz up to about 4 MHz. Because of power attenuation at greater depths of investigation, such as is the case with the longer spaced transmitters, the frequencies preferably conform to the relationship $F_1 \geq F_2 \geq F_3 \geq \ldots F_n$. The oscillators $F_1, F_2, F_3 \ldots F_n$ are controlled by a transmitter enable circuitry 30, which interfaces with a microprocessor 32, which in turn interfaces with a communication interface circuit 34 and an analog-to-digital (A/D) converter 36. Communication interface circuit 34 is conventional and provides an interface between computers (not shown), an internal memory (not shown), a mud pulser (not shown), microprocessor 32, and operators or computers at the earth's surface (not shown) after the tool 10 is removed to the earth's surface.

The differential receivers $R_1$ and $R_2$ are respectively connected to amplifiers 40 and 42, which are connected, respectively, to mixer circuits 44 and 46. Oscillators $F_1', F_2', F_3' \ldots F_n'$ are coupled to an oscillator select circuit 48, the output of which is connected to the respective inputs of mixer circuits 44 and 46. Oscillator select circuit 48 receives its inputs from microprocessor 32.

The respective outputs of mixer circuits 44 and 46 drive low pass filters 50 and 52, respectively, the outputs of which drive amplitude measurement circuits 54 and 56, respectively. The outputs of amplitude measurement circuits 54 and 56 are connected to a multiplexer circuit 60. The outputs of low pass filter circuits 50 and 52 are also connected to the inputs of a relative phase measurement circuit 62, the output of which is fed into multiplexer 60.

Figure 12:
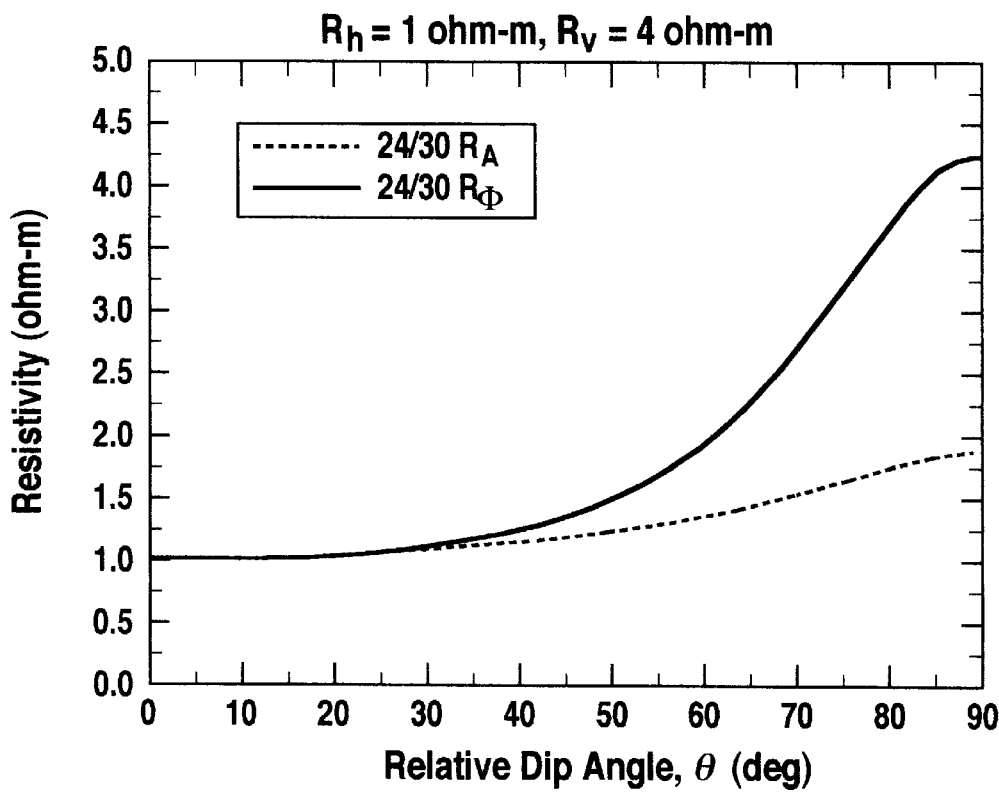
FIG. 12 is a graph of apparent resistivity versus relative dip angle for a typical earth formation using a single transmitter-receiver pair.
Figure 13:
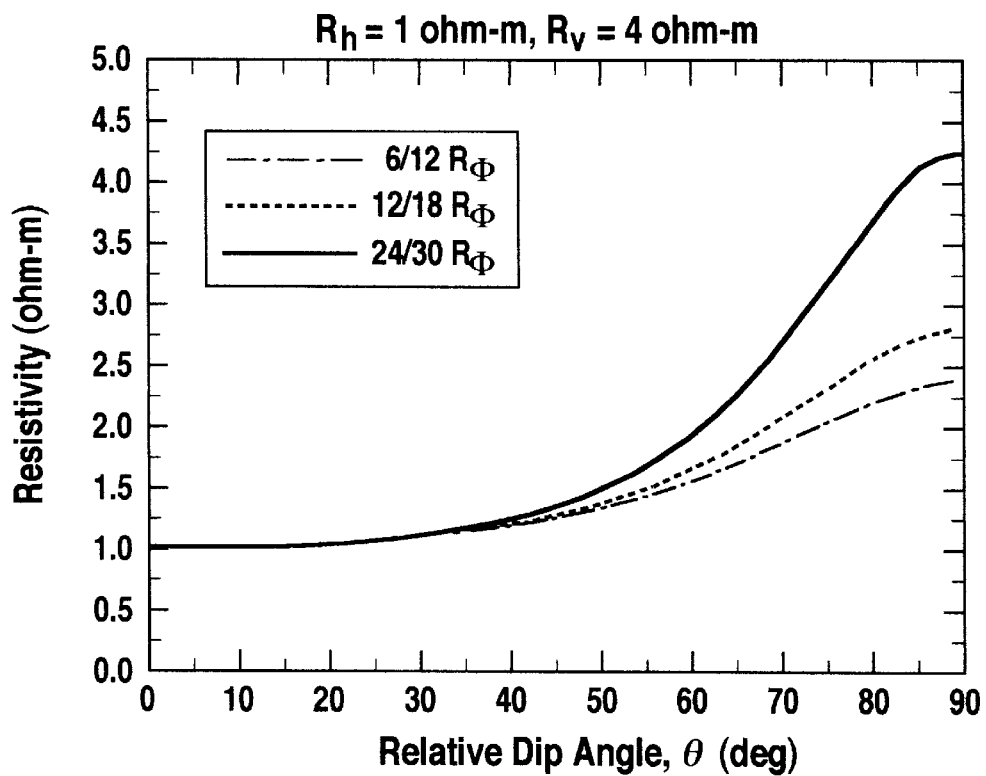
FIG. 13 is a graph of apparent resistivity versus relative dip angle for a typical earth formation using three transmitter-receiver pairs at a single frequency.
Figure 14:
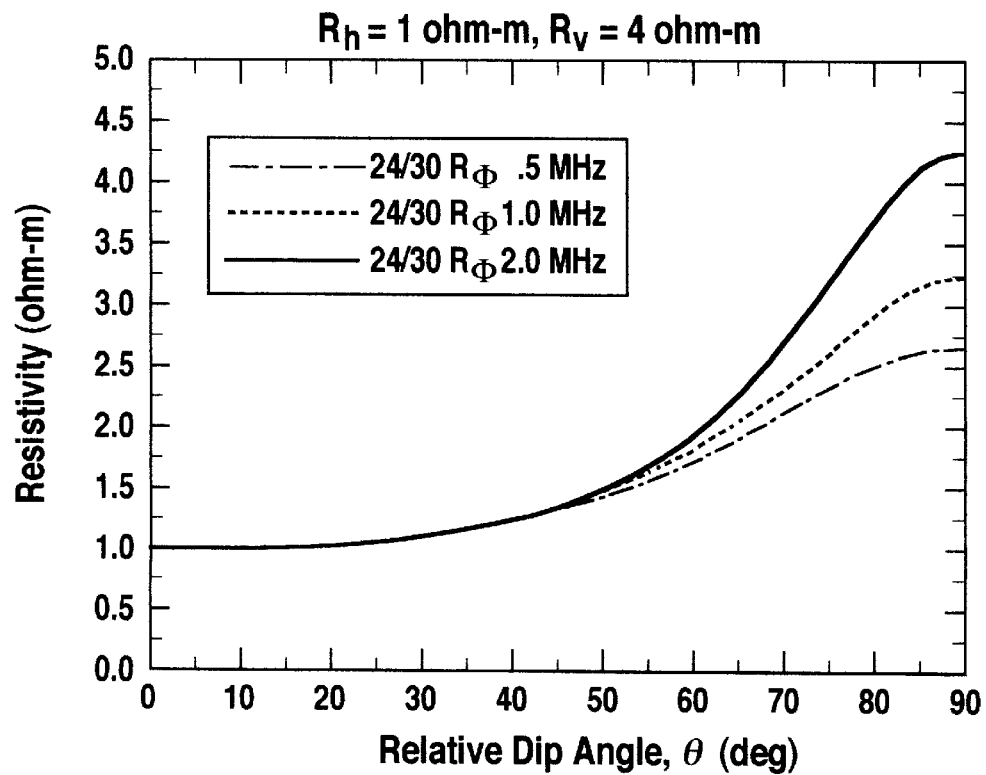
FIG. 14 is a graph of apparent resistivity versus relative dip angle for a typical earth formation using a single transmitter-receiver pair at three different frequencies.

In the operation of the device and circuitry illustrated in FIG. 2, it should be appreciated that it is desirable to process intermediate frequency signals rather than the nominal signals received by receiver pair $R_1$ and $R_2$. Accordingly, the oscillators $F_1', F_2', F_3' \ldots F_n'$ are selected to be very near the corresponding frequencies $F_1, F_2, F_3 \ldots F_n$. For example, $F_n$ can be set at a frequency of 1.998 MHz and thus provide an intermediate frequency coming out of mixer circuit 44 or 46 of 0.002 MHz (2 KHz). In a similar fashion, $F_2'$ and $F_3'$ can be set at 1.998 MHz and 0.998 MHz, respectively. Thus, the only signals that pass to low pass filters 50 and 52 will be the intermediate frequencies which are obtained by mixing the frequencies of $F_1, F_2, F_3 \ldots F_n$ with the frequencies $F_1', F_2', F_3' \ldots F_n'$, respectively. It should be appreciated that amplitude measurement circuit 54 provides a measure of the amplitude of the signal received by receiver $R_1$, whereas amplitude measurement circuit 56 measures the amplitude of the incoming signals received by receiver $R_2$. Similarly, relative phase measurement circuit 62 provides an indication of the phase difference between the signals received at receiver $R_1$ and the signals received at receiver $R_2$. As is well known in the art, the amplitude measurements (ratios, A) and the relative phase measurements ($\Phi$) are both indicative of formation resistivity. Such measurements may be used to generate plots such as those shown in FIGS. 12–14 for a typical earth formation having a horizontal resistivity of 1 ohm-m and a vertical resistivity of 4 ohm-m. FIG. 12 depicts amplitude attenuation resistivity and phase shift resistivity as a function of relative dip angle using a single transmitter-receiver pair at a single frequency. FIG. 13 depicts phase shift resistivity as a function of relative dip angle using three transmitter-receiver pairs at a single frequency. FIG. 14 depicts phase shift resistivity as a function of relative dip angle using a single transmitter-receiver pair at three different frequencies.

Figure 3:
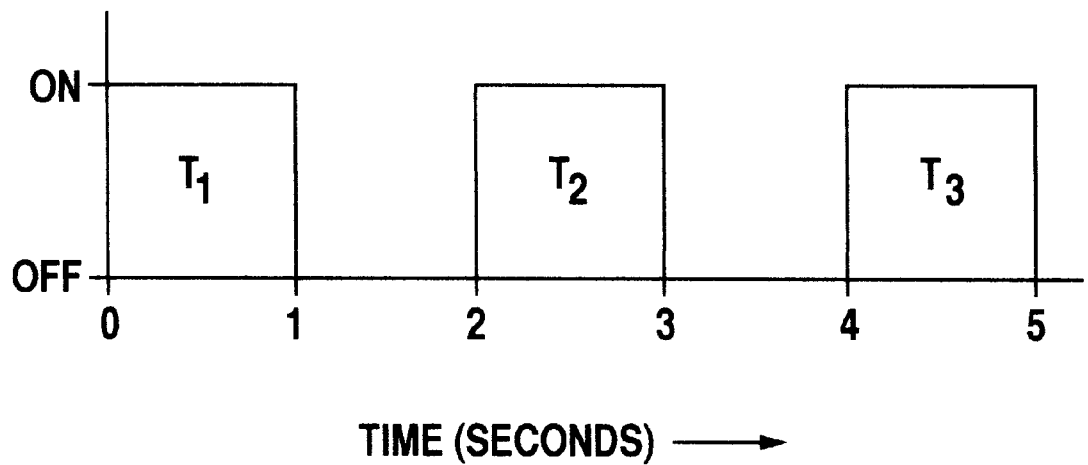
FIG. 3 is a schematic pulse diagram illustrating a time sequence of transmitter pulses of the tool of FIG. 1.
Figure 4:
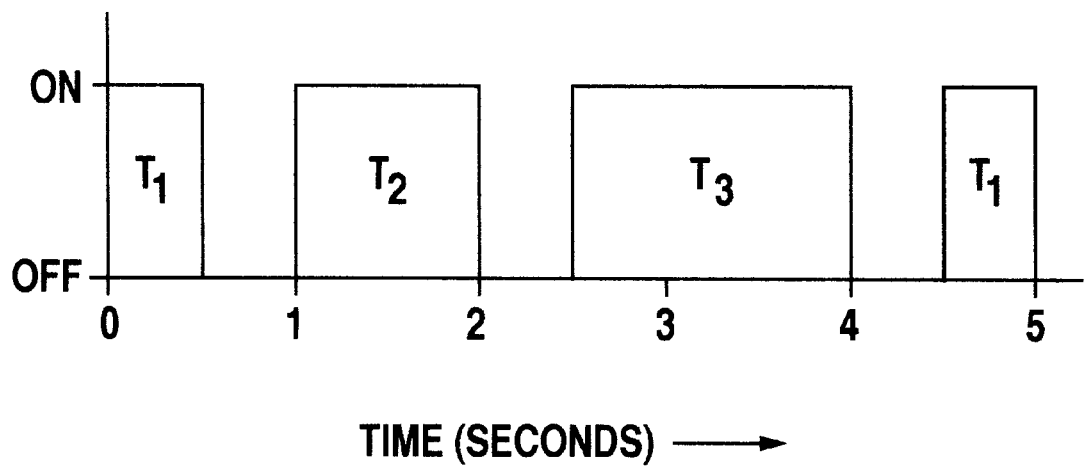
FIG. 4 is a schematic pulse diagram illustrating an alternative time sequence of transmitter pulses of the tool of FIG. 1.

It should also be appreciated that the frequencies $F_1, F_2, F_3 \ldots F_n$ could all be the same frequency except for the practical consideration of power loss in the formation due to the increased distance the signals have to travel through the formation. However, the conventional multiplexer circuitry 60 used with this system enables time separation between the sequential pulsing of the transmitters $T_1, T_2, T_3 \ldots T_n$. For example, as illustrated in FIG. 3, transmitter $T_1$ can be pulsed for one second, followed by no pulse for one second, followed by the pulsation of transmitter $T_2$ for one second, followed by no pulse for one second, followed by a pulsing of transmitter $T_3$ for one second, and so on. Quite obviously, the duration of the pulsing for each transmitter can be varied, as well as the duration of no pulsing in between, for example, as illustrated in FIG. 4. It should be appreciated that the expression "time separation" between pulses includes the preferred embodiment of having one pulse commence immediately with the termination of the immediately preceding pulse. As desired, the duration of the pulses controlling $T_1$ may vary from the duration of the pulses for $T_2$, which may vary from the duration of the pulses for transmitter $T_3$, and so on, in order to provide a signature of the received pulses at receivers $R_1$ and $R_2$ to better identify the transmitters and thus the depth of investigation for the particular pulses being received. Thus, measurements are made to different depths into the formation by activating each transmitter at a different time such that only one transmitter is active at any one time and by recording or telemetering the received phase difference and/or amplitudes (amplitude ratio) corresponding to each transmitted signal. Alternatively, the transmitters $T_1, T_2, T_3 \ldots T_n$ could all be operated at different frequencies and could be pulsed simultaneously, with the separation of signals being a function of frequency difference rather than time separation in accordance with a preferred embodiment of this invention. However, those skilled in the art will recognize that simultaneous transmission of all of the transmitter signals will usually require additional filters and processing circuitry to enable the instrument to properly discriminate between the different frequencies.

Figure 5:
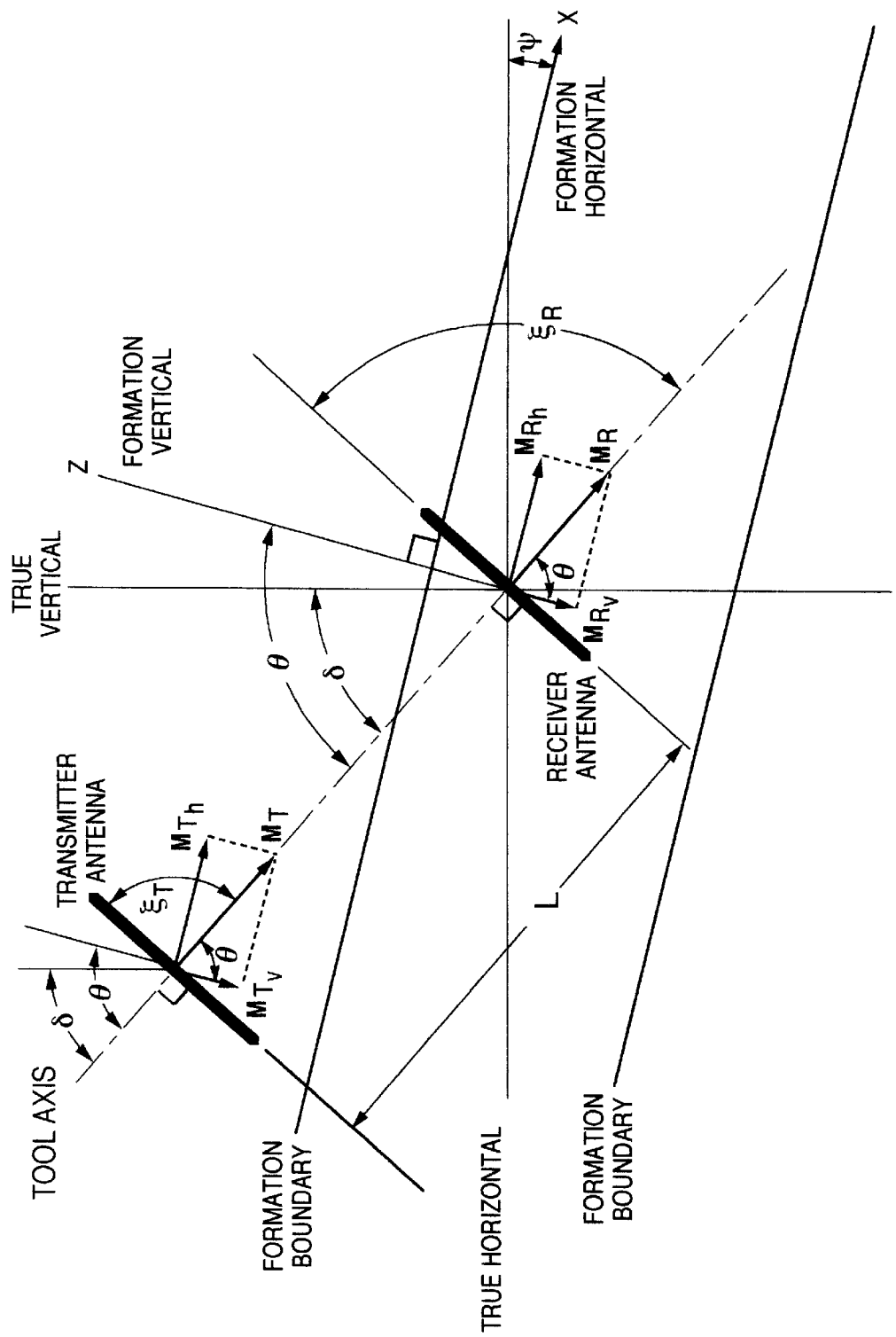
FIG. 5 is a schematic diagram illustrating the antenna geometry of a conventional electromagnetic wave resistivity tool having a transmitter antenna and a receiver antenna, both of which are mounted to the tool in a plane that is orthogonal to the axis of the tool.
Figure 6:
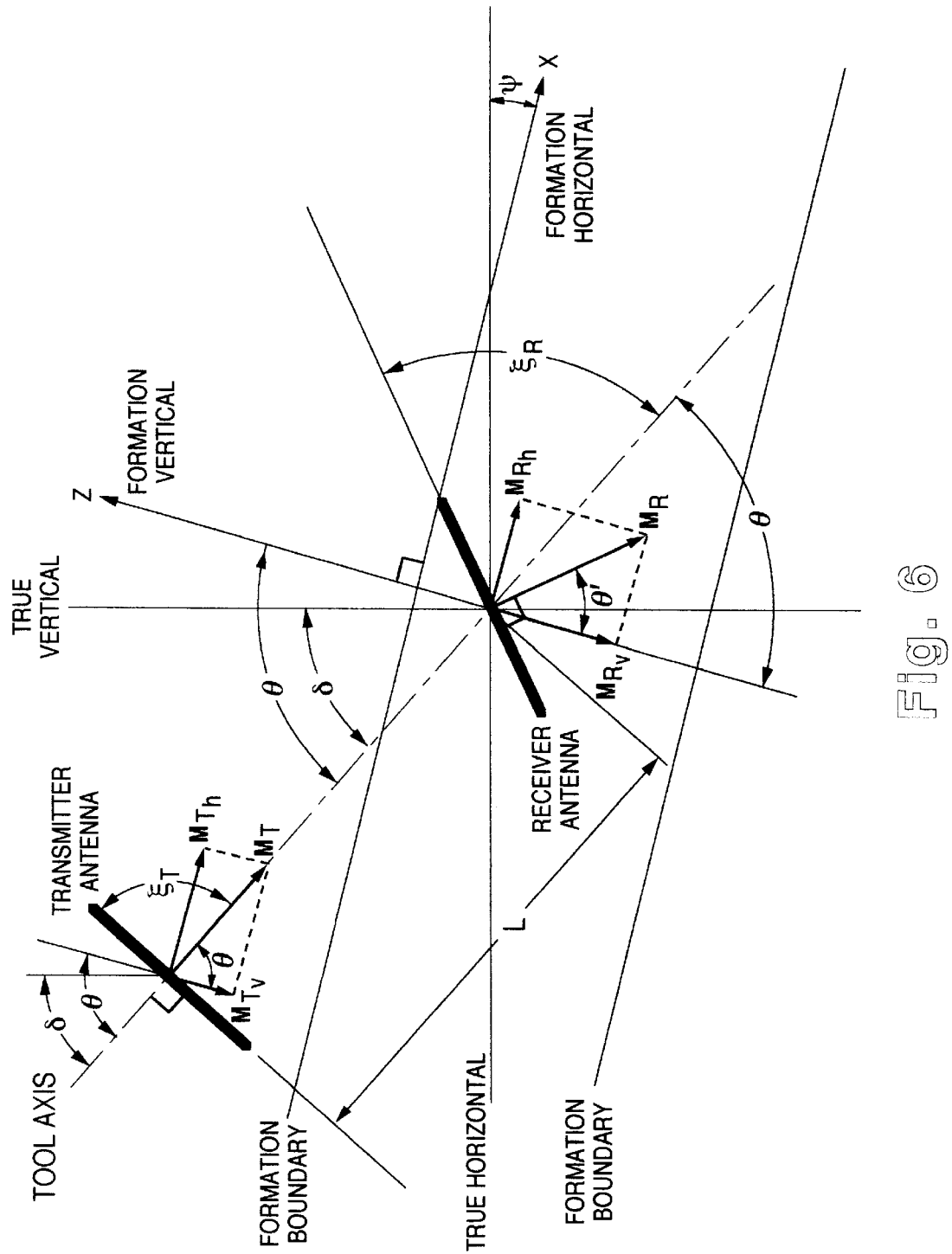
FIG. 6 is a schematic diagram illustrating the antenna geometry of an electromagnetic wave resistivity tool in accordance with the present invention having a transmitter antenna mounted to the tool in a plane that is orthogonal to the axis of the tool and a receiver antenna mounted to the tool in a plane that is not orthogonal to the axis of the tool.
Figure 9:
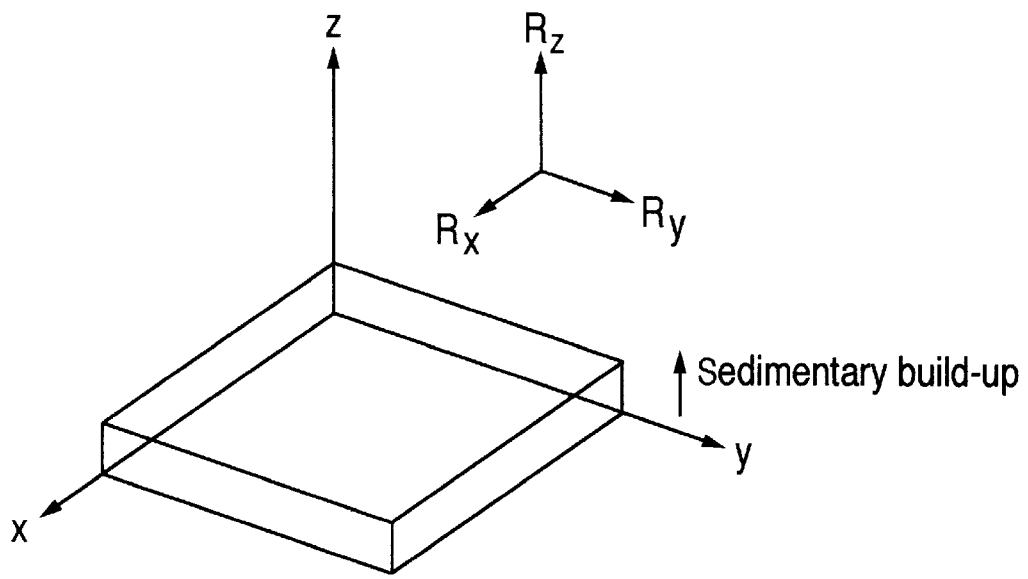
FIG. 9 is a schematic perspective view of a Cartesian coordinate system in a sedimentary earth formation.

As discussed above, due to the nature of sedimentary formations, practitioners in the art use the term "horizontal" to denote the plane of the formation (i.e., the x-y plane of FIG. 9), and practitioners use the term "vertical" to denote the direction perpendicular to the plane of the formation (i.e., the z direction of FIG. 9, which is the direction of sedimentary build-up). For convenience in distinguishing between these terms of art and the ordinary directions associated with the earth's gravity, FIGS. 5 and 6 utilize the following terms: "true vertical" indicates the direction of the earth's gravity; "true horizontal" indicates the direction perpendicular to the earth's gravity; "formation vertical" indicates the direction perpendicular to the plane of the formation; and "formation horizontal" indicates the plane of the formation. In this description, the terms "horizontal" and "vertical" are intended to have the meanings associated with "formation horizontal" and "formation vertical," respectively. In FIGS. 5 and 6, δ is the hole deviation angle (the angle between the borehole/tool axis and the true vertical), and ψ is the bed dip angle (the angle between the formation bed plane and the true horizontal).

Referring to FIG. 5, a transmitter coil (antenna) with a magnetic moment $M_T$ can be considered as the superposition of a horizontal magnetic dipole (HMD) and a vertical magnetic dipole (VMD), with corresponding horizontal and vertical component magnetic moments $M_{T_h}$ and $M_{T_v}$, respectively, which are given by the equations $$M_{T_h} = M_T \sin\theta = I_t A_t \sin\theta \quad [1]$$

$$M_{T_v} = M_T \cos\theta = I_t A_t \cos\theta \quad [2]$$

where $I_t$=the current in the transmitter coil, $A_t$=the cross-sectional area of the transmitter coil, and θ=the relative dip angle (the angle between the tool axis and the normal to the formation).

As shown by Luling, M. G., "Processing and Modeling 2-MHz Resistivity Tools in Dipping, Laminated, Anisotropic Formations." SPWLA 35th Annual Logging Symposium, Jun. 19–22, 1994, the HMD produces magnetic fields $H_{hx}$ and $H_{hz}$, and the VMD produces magnetic fields $H_{vx}$ and $H_{vz}$ as follows:

$$H_{hx} = \frac{M_T \sin\theta}{4\pi}$$

$$\left(\frac{e^{ik_h L}}{L^3}\left[3\sin^2\theta - 1 + k_h^2 L^2 \cos^2\theta + \frac{ik_h L}{\sin^2\theta} + ik_h L - 3ik_h L \sin^2\theta\right] - \frac{ik_h}{\sin^2\theta}e^{ik_h L\beta}\right)e^{ik_h L} \quad [3]$$

$$H_{hz} = \frac{M_T \cos\theta}{4\pi}\left(\frac{e^{ik_h L}}{L^3}[3\cos\theta\sin\theta - k_h^2 L^2 \cos\theta\sin\theta - 3ik_h L\cos\theta\sin\theta]\right) \quad [4]$$

$$H_{vx} = \frac{M_T \sin\theta}{4\pi}\left(\frac{e^{ik_h L}}{L^3}[3\cos\theta\sin\theta - k_h^2 L^2 \cos\theta\sin\theta - 3ik_h L\cos\theta\sin\theta]\right) \quad [5]$$

$$H_{vz} = \frac{M_T \cos\theta}{4\pi}\left(\frac{e^{ik_h L}}{L^3}[3\cos^2\theta - 1 + k_h^2 L^2 \sin^2\theta - 3ik_h L\cos^2\theta + ik_h L]\right) \quad [6]$$

where $$k_h = \sqrt{\omega^2 \mu\left(\varepsilon_h - \frac{i\sigma_h}{\omega}\right)}$$

$$k_v = \sqrt{\omega^2 \mu\left(\varepsilon_v - \frac{i\sigma_v}{\omega}\right)}$$

$$\beta = \sqrt{\cos^2\theta + \left(\frac{k_v}{k_h}\right)^2 \sin^2\theta}$$

$k_h$=the complex wave number in the horizontal direction $k_v$=the complex wave number in the vertical direction ω=the angular frequency (in radians/second) of the transmitter coil=2 πf f=the frequency of the transmitter coil (in Hertz)

μ=the magnetic permeability of the formation (assume $\mu=\mu_{air}=1$)

$\sigma_h$=the horizontal conductivity of the formation $\sigma_v$=the vertical conductivity of the formation $\epsilon_h$=the horizontal dielectric constant (assumed)

$\epsilon_v$=the vertical dielectric constant (assumed)

L=the distance between the transmitter coil and the receiver coil i=$\sqrt{-1}$

If a receiver is parallel to the transmitter, for a conventional configuration as shown in FIG. 5 in which $\xi_T=\xi_R=90°$, the $H_z$ field in the receiver loop is given by the equation $$H_z=(H_{hx}+H_{vx})\sin\theta+(H_{vz}+H_{hz})\cos\theta \quad [7]$$

and the induced voltage in the receiver loop is $$V=i\omega A_r \mu H_z \quad [8]$$

where $A_r$ is the cross-sectional area of the receiver coil. Substituting Eqs. [3], [4], [5], [6], and [7] into Eq. [8] yields $$V = \frac{i\omega A_r \mu I_t A_t}{4\pi L^3}([2 - ik_h L]e^{ik_h L} - ik_h L e^{ik_h L\beta}) \quad [9]$$

Equation [9] shows that the induced voltage, V, depends on $k_h$ and β. In turn, $k_h$ depends on $\sigma_h$; and β depends on $\sigma_h$, $\sigma_v$, and θ. These relationships indicate that $\sigma_v$ and θ are dependent, and this dependency prevents convergence of a simultaneous solution for $\sigma_h$, $\sigma_v$, and θ, as discussed above.

To break this dependency and enable a solution for $\sigma_h$, $\sigma_v$, and θ, the present inventor discovered that one may tilt either the transmitter or the receiver with respect to the tool axis, as shown in FIG. 6 (transmitter not tilted, receiver tilted). For a transmitter/receiver configuration as shown in FIG. 6 in which $\xi_T=90°$ and $\xi_R<90°$, the $H_z$ field in the receiver loop is given by the equation $$H_z=(H_{hx}+H_{vx})\sin\theta'+(H_{vz}+H_{hz})\cos\theta' \quad [10]$$

Substitution of Eqs. [3], [4], [5], [6], and [10] into Eq. [8] yields $$V = \frac{i\omega A_r \mu I_t A_t}{4\pi L^3}\left(+[2\sin\theta\sin\theta' + 2\cos\theta\cos\theta']e^{ik_hL} - \right. \quad [11]$$

$$[2ik_hL\sin\theta\sin\theta' - 2ik_hL\cos\theta\cos\theta']e^{ik_hL} +$$

$$\left. ik_hL\frac{\sin\theta'}{\sin\theta}e^{ik_hL} - ik_hL\frac{\sin\theta'}{\sin\theta}e^{ik_hL\beta}\right)$$

where $\theta' = \theta + \xi_R - 90°$ $\xi_R$=the angle of tilt of the receiver antenna (i.e., the angle between the plane of the receiver antenna and the tool axis)

$\xi_T$=the angle of tilt of the transmitter antenna (i.e., the angle between the plane of the transmitter antenna and the tool axis).

Figure 7:
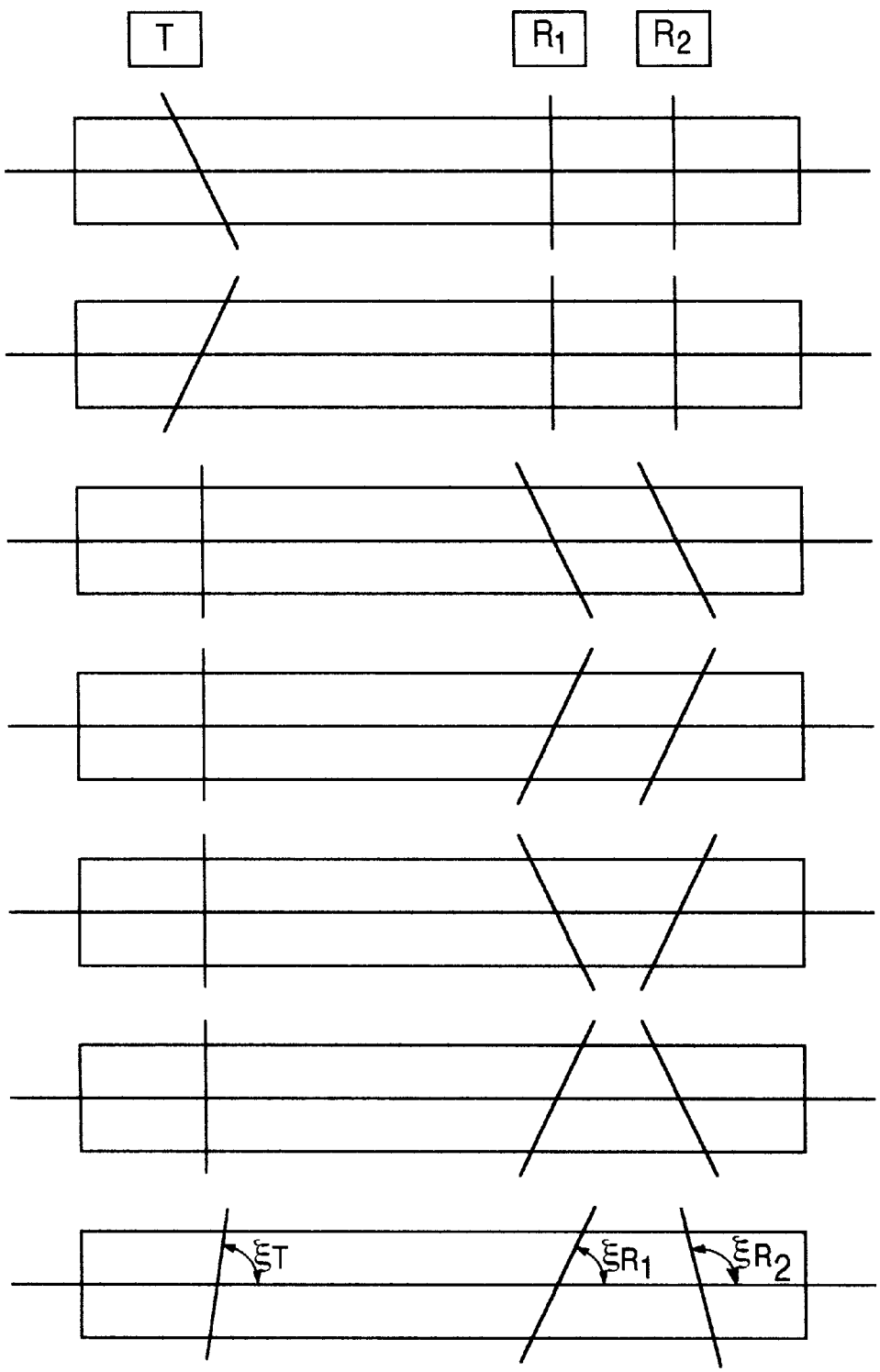
FIG. 7 is a schematic diagram illustrating several possible transmitter/receiver antenna configurations in accordance with the present invention.

Equation [11] shows that the induced voltage, V, depends on $k_h$, $\beta$, $\theta$, and $\theta'$. As long as $\theta$ is different from $\theta'$, then $\theta$ can be calculated from three measurements using a multiple spacing or multiple frequency electromagnetic wave resistivity tool. By tilting either the receiver or the transmitter of an electromagnetic wave resistivity sensor (i.e., by making $\theta$ different from $\theta'$), $\sigma_v$ and $\theta$ are decoupled, which enables a solution for $\sigma_h$, $\sigma_v$, and $\theta$ as described below. Although the above formulation is for an untilted transmitter with a tilted receiver, the theory of reciprocity provides that the same result also applies to a tilted transmitter with an untilted receiver. Indeed, both the transmitter and the receiver may be tilted, provided that the respective angles of tilt are not the same, i.e., $\xi_T \neq \xi_R$. For the general case in which both the transmitter and the receiver are tilted at arbitrary angles $\xi_T$ and $\xi_R$, respectively, Eqs. [1] through [11] apply with the substitution of $\theta''$ for $\theta$, where $\theta'' = \theta + \xi_T - 90°$. FIG. 7 illustrates several possible transmitter/receiver pair combinations in accordance with the present invention.

Figure 8:
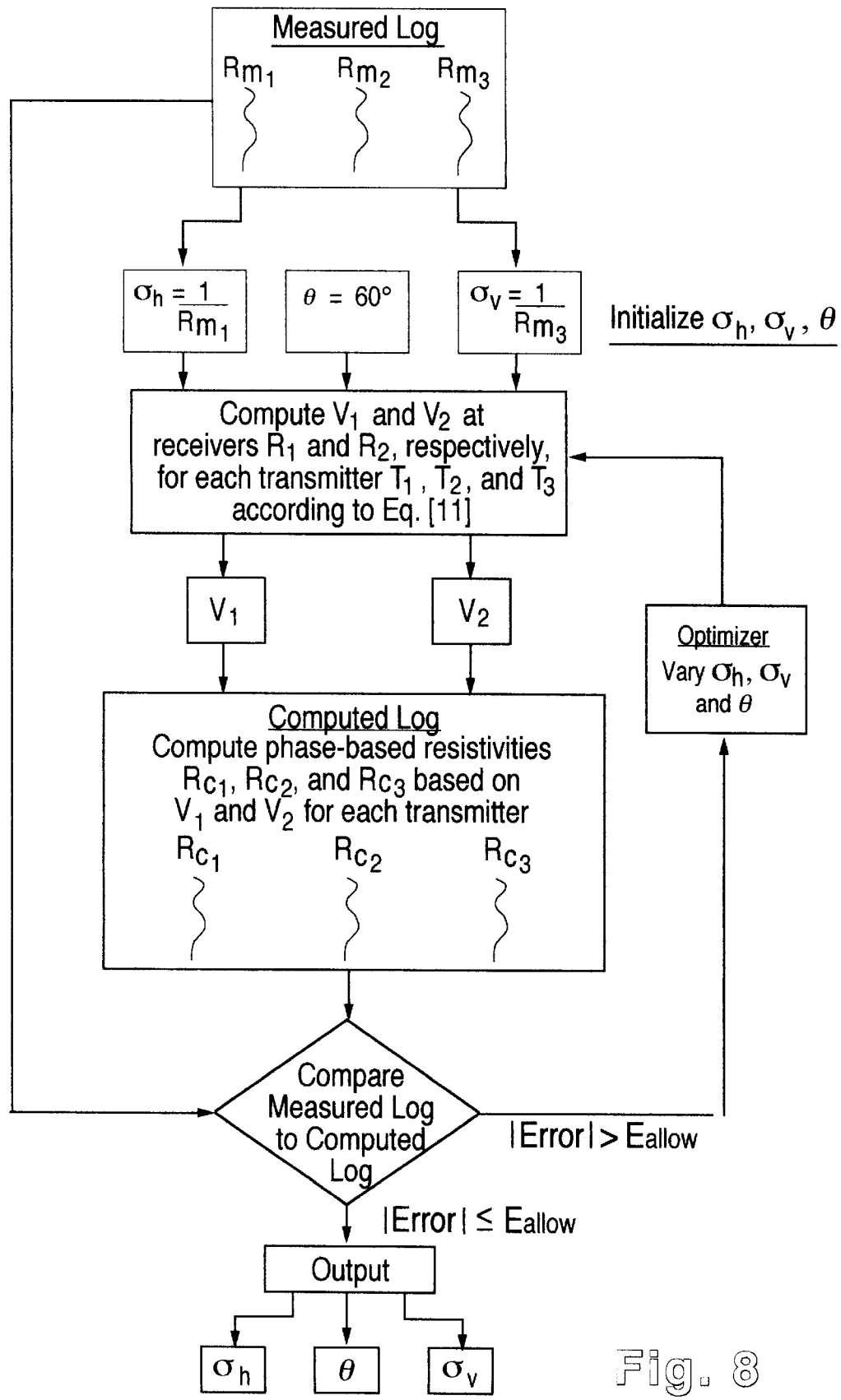
FIG. 8 is a schematic block diagram illustrating the process of solving for horizontal conductivity, vertical conductivity, and relative dip angle in accordance with the present invention.
Figure 10:
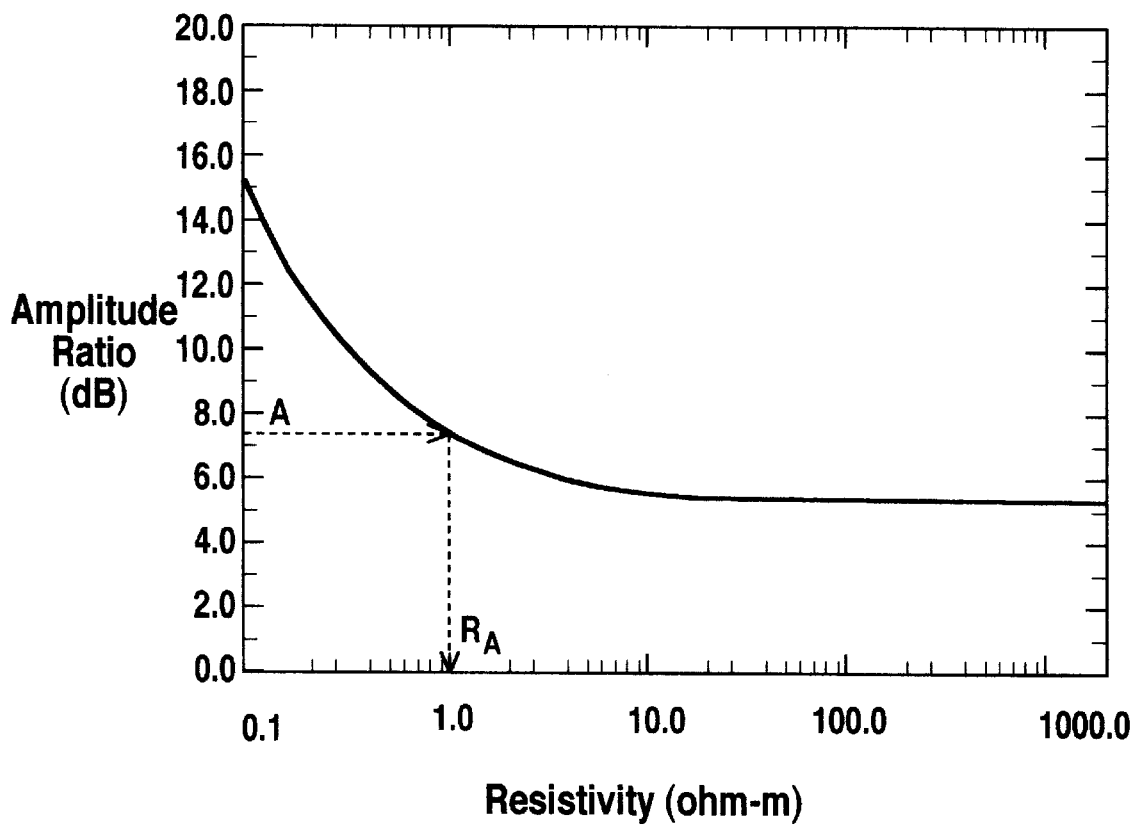
FIG. 10 is a graph of amplitude attenuation versus resistivity for a typical earth formation.
Figure 11:
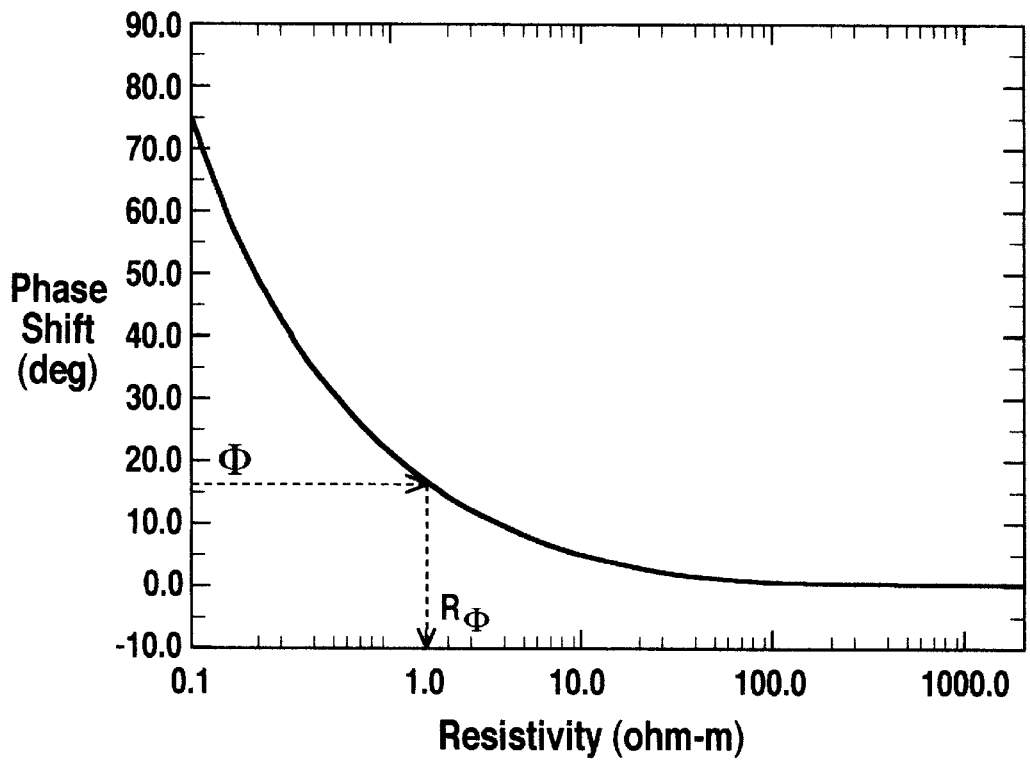
FIG. 11 is a graph of phase shift versus resistivity for a typical earth formation.

FIG. 8 illustrates the process of obtaining the horizontal resistivity, vertical resistivity, and relative dip angle of an earth formation in accordance with the present invention. Although the diagram of FIG. 8 shows horizontal and vertical conductivity rather than horizontal and vertical resistivity, persons reasonably skilled in the art understand that conductivity is the reciprocal of resistivity, and either conductivity or resistivity may be used to refer to the essential electrical property of an earth formation. The solution process begins with an initialization of the three parameters for which a solution is sought, namely, horizontal conductivity ($\sigma_h$), vertical conductivity ($\sigma_v$), and relative dip angle ($\theta$). As shown in FIG. 8, $\sigma_h$ and $\sigma_v$ may conveniently be initialized to the reciprocals of the measured resistivity values (measured log) as obtained from two of the three transmitter/receiver combinations according to methods well known in the art. Specifically, for each transmitter/receiver combination, the transmitter is pulsed and the phase shift ($\Phi$) and amplitude attenuation (A) of the receiver pair are measured. Then, using data such as that represented in FIGS. 10 and 11, the amplitude attenuation resistivity and phase shift resistivity, respectively, are obtained. The phase shift resistivities provide preferred initial estimates for $\sigma_h$ and $\sigma_v$, but the amplitude attenuation resistivities could also be used. Similarly, a convenient initial estimate for $\theta$ is 60°, which is within the range in which anisotropy typically becomes evident. Persons skilled in the art will appreciate that these preferred values for the initial parameter estimates serve the purpose of convenience to enhance the convergence of a solution. However, these particular values are not essential to the success of this invention, and the initial parameter estimates may be arbitrary.

Still referring to FIG. 8, after the parameters are initialized, these parameters are used to calculate theoretical "induced" voltages, $V_1$ and $V_2$, in receivers $R_1$ and $R_2$, respectively, for each transmitter according to Eq. [11]. Next, the calculated voltages are used to obtain computed resistivities $R_{C_1}$, $R_{C_2}$, and $R_{C_3}$ (computed log) corresponding to each transmitter/receiver pair combination, respectively. Again, the computed resistivities are obtained according to methods well known in the art using data such as that shown in FIGS. 10 and 11, and the phase shift resistivities are preferred over the amplitude attenuation resistivities. The computed resistivities are then compared to the measured resistivities, and the difference between the computed resistivities and the measured resistivities is used to form a suitable error measurement. If the magnitude of the error is less than or equal to an allowable error value, $E_{allow}$, then the current values for $\sigma_h$, $\sigma_v$, and $\theta$ are taken to be the solution. Otherwise, the values for $\sigma_h$, $\sigma_v$, and $\theta$ are incremented in an iterative optimization routine until the error is within the allowable error value. Any suitable optimization routine may be used, such as a least squares method. A preferred optimization method is the Levenberg-Marquardt method discussed by Tianfei Zhu and Larry D. Brown, "Two-dimensional Velocity Inversion and Synthetic Seismogram Computation," Geophysics, vol. 52, no. 1, January 1987, p. 37–50, which is incorporated herein by reference.

Although the foregoing specific details describe a preferred embodiment of this invention, persons reasonably skilled in the art of petroleum well drilling and logging will recognize that various changes may be made in the details of the method and apparatus of this invention without departing from the spirit and scope of the invention as defined in the appended claims. Therefore, it should be understood that this invention is not to be limited to the specific details shown and described herein.

I claim:

1. A tool for determining the horizontal and vertical resistivities and relative dip angle of an earth formation, said tool having a tool axis and comprising:

at least one transmitter antenna disposed within a plane oriented at a first angle with respect to the tool axis for transmitting electromagnetic energy into said formation;

a first receiver antenna spaced at a first distance away from said at least one transmitter antenna along the tool axis and disposed within a plane oriented at a second angle with respect to said tool axis, said second angle being different from said first angle, for receiving electromagnetic energy from said formation caused by said at least one transmitter antenna and generating a first response signal representative of the resistivity of said formation;

a second receiver antenna spaced at a second distance away from said at lest one transmitter antenna along said tool axis and disposed within a plane oriented at a third angle with respect to said tool axis, said second distance being different from said first distance and said third angle being different from said first angle, for receiving electromagnetic energy from said formation caused by said at least one transmitter antenna and generating a second response signal representative of the resistivity of said formation; and a processor for calculating the horizontal resistivity, vertical resistivity, and relative dip angle based on said first and second response signals.

2. The tool of claim 1 wherein said at least one transmitter antenna comprises three such transmitter antennas spaced apart from one another along said tool axis.

3. The tool of claim 2 wherein said three transmitter antennas operate at the same frequency.

4. The tool of claim 2 wherein said first angle is 90°.

5. The tool of claim 2 wherein said second angle and said third angle are the same.

6. The tool of claim 5 wherein said second angle and said third angle are 90°.

7. The tool of claim 1 wherein said at least one transmitter antenna comprises a single transmitter antenna that operates at three different frequencies.

8. The tool of claim 7 wherein said first angle is 90°.

9. The tool of claim 7 wherein said second angle and said third angle are the same.

10. The tool of claim 9 wherein said second angle and said third angle are 90°.

11. A tool for determining the horizontal and vertical resistivities and relative dip angle of an earth formation, said tool having an axis and comprising:
   at least one transmitter antenna disposed within a plane oriented at a first angle with respect to said tool axis for transmitting electromagnetic energy into said formation;
   a first receiver antenna spaced at a first distance away from said at least one transmitter antenna along said tool axis and disposed within a plane oriented at a second angle with respect to said tool axis, said second angle being different from said first angle, for receiving electromagnetic energy from said formation caused by said at least one transmitter antenna and generating a first response signal representative of the resistivity of said formation;
   a second receiver antenna spaced at a second distance away from said at least one transmitter antenna along said tool axis and disposed within a plane oriented at a third angle with respect to said tool axis, said second distance being different from said first distance and said third angle being different from said first angle, for receiving electromagnetic energy from said formation caused by said at least one transmitter antenna and generating a second response signal representative of the resistivity of said formation; and
   a processor for (a) receiving said first and second response signals; (b) generating a measured resistivity signal representative of the resistivity of said formation based on said first and second response signals; (c) establishing initial values for the horizontal resistivity, vertical resistivity, and relative dip angle of said formation; (d) computing theoretical response signals for said first and second receiver antennas based on said initial values for the horizontal resistivity, vertical resistivity, and relative dip angle; (e) generating a computed resistivity signal based on said theoretical response signals; (f) computing an error value based on the difference between said measured resistivity signal and said computed resistivity signal; (g) modifying said initial values for the horizontal resistivity, vertical resistivity, and relative dip angle based on said error value; and (h) repeating functions (d) through (g) until said error value meets a predetermined allowable error criterion.

12. The tool of claim 11 wherein said at least one transmitter antenna comprises three such transmitter antennas spaced apart from one another along said tool axis.

13. The tool of claim 12 wherein said three transmitter antennas operate at the same frequency.

14. The tool of claim 12 wherein said first angle is 90°.

15. The tool of claim 12 wherein said second angle and said third angle are the same.

16. The tool of claim 15 wherein said second angle and said third angle are 90°.

17. The tool of claim 11 wherein said at least one transmitter antenna comprises a single transmitter antenna that operates at three different frequencies.

18. The tool of claim 17 wherein said first angle is 90°.

19. The tool of claim 17 wherein said second angle and said third angle are the same.

20. The tool of claim 19 wherein said second angle and said third angle are 90°.

21. The tool of claim 11 wherein said measured resistivity signal comprises a phase shift resistivity based on the difference in phase between said first and second response signals.

22. The tool of claim 11 wherein said measured resistivity signal comprises an amplitude attenuation resistivity based on the ratio of the amplitudes of said first and second response signals.

23. The tool of claim 11 wherein said computed resistivity signal comprises a phase shift resistivity based on the difference in phase between said theoretical response signals for said first and second receiver antennas.

24. The tool of claim 11 wherein said computed resistivity signal comprises an amplitude attenuation resistivity based on the ratio of the amplitudes of said theoretical response signals for said first and second receiver antennas.

25. The tool of claim 11 wherein said initial values for said horizontal resistivity and said vertical resistivity are based on said measured resistivity signal.

26. The tool of claim 11 wherein said functions (d) through (h) for said processor comprise a least squares optimization.

27. The tool of claim 11 wherein said functions (d) through (h) for said processor comprise a Levenberg-Marquardt optimization.

28. A method for determining the horizontal and vertical resistivities and relative dip angle of an earth formation comprising the steps of:
   (a) placing in a borehole an induction logging tool having an axis and comprising (i) at least one transmitter antenna disposed within a plane oriented at a first angle with respect to said tool axis; (ii) a first receiver antenna spaced at a first distance away from said at least one transmitter antenna along said tool axis and disposed within a plane oriented at a second angle with respect to said tool axis, said second angle being different from said first angle; and (iii) a second receiver antenna spaced at a second distance away from said at least one transmitter antenna along said tool axis and disposed within a plane oriented at a third angle with respect to said axis of said tool, said second distance being different from said first distance and said third angle being different from said first angle;
   (b) generating at least three pairs of first and second response signals by transmitting electromagnetic energy into said formation from said at least one transmitter antenna and receiving electromagnetic energy at said first and second receiver antennas;
   (c) generating at least three measured resistivity signals representative of the resistivity of said formation based on said at least three pairs of first and second response signals;
   (d) establishing initial values for said horizontal resistivity, vertical resistivity, and relative dip angle of said formation;

generating at least three pairs of theoretical response signals for said first and second receiver antennas based on said initial values for said horizontal resistivity, vertical resistivity, and relative dip angle;

(f) generating at least three computed resistivity signals based on said at least three pairs of theoretical response signals;

(g) generating an error value based on the differences between said measured resistivity signals and said computed resistivity signals;

(h) modifying said initial values for said horizontal resistivity, vertical resistivity, and relative dip angle based on said error value; and (i) repeating steps (e) through (h) until said error value meets a predetermined allowable error criterion.

29. The method of claim 28 wherein:

said at least one transmitter antenna comprises three such transmitter antennas spaced apart from one another along said tool axis; and said at least three pairs of first and second response signals are generated, respectively, by transmitting electromagnetic energy from said three transmitter antennas and receiving electromagnetic energy at said first and second receiver antennas.

30. The method of claim 28 wherein:

said at least one transmitter antenna comprises a single transmitter antenna that operates at three different frequencies; and said at least three pairs of first and second response signals are generated, respectively, by transmitting electromagnetic energy from said single transmitter antenna at said three different frequencies and receiving electromagnetic energy at said first and second receiver antennas.

31. The method of claim 28 wherein said at least three measured resistivity signals are representative of the phase shift resistivity of said formation based on the difference in phase between said first and second response signals.

32. The method of claim 28 wherein said at least three measured resistivity signals are representative of the amplitude attenuation resistivity of said formation based on the respective ratios of amplitudes of said first and second response signals.

33. The method of claim 28 wherein said at least three computed resistivity signals are representative of phase shift resistivity based on the respective differences in phase between said at least three pairs of theoretical response signals.

34. The method of claim 28 wherein said at least three computed resistivity signals are representative of amplitude attenuation resistivity based on the respective ratios of amplitudes of said at least three pairs of theoretical response signals.

35. The method of claim 28 wherein said initial values for said horizontal resistivity and said vertical resistivity are based on said measured resistivity signals.

36. The method of claim 28 wherein said steps (e) through (i) comprise a least squares optimization.

37. The method of claim 28 wherein said steps (e) through (i) comprise a Levenberg-Marquardt optimization.

* * * * *